United States Patent [19]
Takahashi

[11] Patent Number: 5,528,163
[45] Date of Patent: Jun. 18, 1996

[54] METHOD OF INSPECTING CELLS OF LIQUID CRYSTAL DISPLAY

[75] Inventor: Isamu Takahashi, Tokyo, Japan

[73] Assignee: Tohken Industries Co., Ltd., Tokyo, Japan

[21] Appl. No.: 501,554

[22] Filed: Jul. 12, 1995

[30]     Foreign Application Priority Data

May 23, 1995   [JP]   Japan ........................... 102895

[51] Int. Cl.$^6$ ........................... G01R 1/04; G01R 31/02; G02F 1/1335
[52] U.S. Cl. ........................... 324/770; 324/769; 345/93; 359/57
[58] Field of Search ........................... 324/770, 769, 324/537, 519, 672, 686, 140 R, 73.1, 72, 115, 750, 751, 771, 772; 345/93; 359/57, 59, 62

[56]     References Cited

U.S. PATENT DOCUMENTS 5,184,082  2/1993  Nelson ........................... 324/537
5,377,030  12/1994  Suzuki et al. ........................... 359/57
5,428,300  6/1995  Takahashi et al. ........................... 324/770
5,465,053  11/1995  Edwards ........................... 324/770

*Primary Examiner*—Kenneth A. Wieder
*Assistant Examiner*—Barry C. Bowser
*Attorney, Agent, or Firm*—Burgess, Ryan and Wayne

[57]     ABSTRACT

A method of inspecting cells of liquid crystal displays comprising the first step in which the empty TFTs in the active color LCD arrays are energized to charge the auxiliary pixel capacitor corresponding to the individual electrodes, the charged condition is maintained by deenergizing the TFT's, the electric charge is released through the source and drain of the TFTs and the resistor connected to the ground side thereof by re-energizing the TFTs, and the amount of the discharge is measured and the second step in which the same energizing, deenergizing, re-energizing, charging, discharging and measurement as done in the first step are made on the TFTs filled with a liquid crystal in the active color LCD arrays, the difference between the amounts of discharge measured in the first and second steps is integrated or the time constant of the amount of discharge measured in the first step is deducted from the time constant of the amount of discharge measured in the second step.

4 Claims, 5 Drawing Sheets

METHOD OF INSPECTING CELLS OF LIQUID CRYSTAL DISPLAY

BACKGROUND OF THE INVENTION

This invention relates to a method of inspecting liquid crystal display cells in TFT arrays after filling a liquid crystal therein.

Generally, TFT liquid crystal displays must be inspected for irregularities in arrays, empty cells and display cells filled with a liquid crystal that are assembled into liquid crystal modules of individual pixels.

The inventor proposed a technology related to a method of inspecting the arrays and cells of TFT liquid crystal displays before they are assembled into modules in Japanese Patent Application No. 133796 of 1993.

This technology essentially relates to a method of inspecting each cell of an active color TFT liquid crystal display (LCD) of the type shown in FIG. 1. The active color TFT LCD is connected to a grounded auxiliary pixel capacitor $C_s$ to which the drain side of a TFT is connected in an equivalent circuit of the type shown in FIG. 2. With the TFT energized for a certain length of time, the cell capacitor of the LCD is charged through the data line, as shown in FIG. 3. After de-energizing the TFT for a certain length of time and maintaining the charged condition, the TFT is re-energized to release the electric charge through the source and drain of the TFT and the resistor connected to the ground side thereof. Then, whether wiring is normally connected or not is judged from a drop in the voltage output from a discharge current detecting resistor.

Inspections of the TFT arrays and the condition of their connections are completed before display cells are formed by filling in a liquid crystal in individual pixel cells. Thus, whether or not the cells filled with liquid crystal are normal or a liquid crystal has been properly filled in individual cells is determined by checking if the pixel capacitor $C_{LC}$ provided between the pixel and opposed electrodes of the TFT in each cell filled with a liquid crystal shows a normal discharge.

Conventionally, whether or not the pixel capacitor $C_{LC}$ shows a normal discharge has been checked by examining the condition of the pixel capacitor $C_{LC}$ alone by cutting off the connection with the ground of the auxiliary pixel capacitor $C_s$, as shown in FIG. 4(a).

However, this method does not permit inspecting the pixel capacitor $C_{LC}$ alone for the reason given below.

Actually, very large stray capacitances exist between the auxiliary pixel capacitor $C_s$ and the opposed electrode 8 and adjoining gate line $G_{i+1}$, as shown in FIG. 4(b). Therefore, the condition of the pixel capacitor $C_{LC}$ remains the same as one with the auxiliary pixel capacitor $C_s$ even when connection between one end thereof and the ground is cut off.

In FIG. 4(b), $C_{F1}$ designates a stray capacitance between the terminal $S_T$ of a connecting line connected to the auxiliary pixel capacitor $C_s$ and floating away from the ground and the opposed electrode 8, whereas $C_{F2}$ denotes a stray capacitance between the terminal $S_T$ and the adjoining gate line $G_{i+1}$. The auxiliary pixel capacitor $C_s$ is connected to the ground through the stray capacitances $C_{F1}$ and $C_{F2}$. The stray capacitances $C_{F1}$ and $C_{F2}$ are more than 100 times larger than the capacity of the auxiliary pixel capacitor $C_s$. Even if the auxiliary pixel capacitor $C_s$ is cut off from the ground with a view to inspecting the pixel capacitor $C_{LC}$ alone, the influence of the auxiliary pixel capacitor $C_s$ remains uneliminated.

The total capacitance between the drain and ground of a TFT can be expressed as $C_{LC}+C_s(C_{F1}+C_{F2})/(C_s+C_{F1}+C_{F2})$. Because $C_{F1}, C_{F2} > C_s$, the total capacitance becomes substantially equal to $C_{LC}+C_s$. This means that cutting off of the auxiliary pixel capacitor $C_s$ from the ground produces little effect. (In FIG. 4(b), stray capacitance exists between the adjoining gate line and opposed electrode. However, the influence of the stray capacitance therebetween is negligible because the adjoining gate line and opposed electrode are connected to the ground and, therefore, there is no voltage difference therebetween.)

The object of this invention is to provide a method of realizing a charging and discharging inspection of the pixel capacitor $C_{LC}$ alone by eliminating the shortcomings of conventional inspection methods of the type shown in FIG. 4(a).

SUMMARY OF THE INVENTION

To solve the problems described earlier, this invention provides:

(1) A method of inspecting cells of liquid crystal displays comprising the first step in which the empty TFTs in the active color LCD arrays are energized to charge the auxiliary pixel capacitor corresponding to the individual electrodes, the charged condition is maintained by deenergizing the TFT's, the electric charge is released through the source and drain of the TFTs and the resistor connected to the ground side thereof by re-energizing the TFTs, and the amount of the discharge is measured and the second step in which the same energizing, deenergizing, re-energizing, charging, discharging and measurement as done in the first step are made on the TFTs filled with a liquid crystal in the active color LCD arrays, the difference between the amounts of discharge measured in the first and second steps is integrated or the difference between the integrated values of the amounts of discharge measured in the first and second steps is determined; and (2) A method of inspecting cells of liquid crystal displays comprising the first step in which the empty TFTs in the active color LCD arrays are energized to charge the auxiliary pixel capacitor corresponding to the individual electrodes, the charged condition is maintained by deenergizing the TFT's, the electric charge is released through the source and drain of the TFTs and the resistor connected to the ground side thereof by re-energizing the TFTs, and the amount of the discharge is measured and the second step in which the same energizing, deenergizing, re-energizing, charging, discharging and measurement as done in the first step are made on the TFTs filled with a liquid crystal in the active color LCD arrays, and the time constant of the amount of discharge measured in the first step is deducted from the time constant of the amount of discharge measured in the second step.

DETAILED DESCRIPTION OF THE INVENTION

The operating principle of this invention will be described below.

In the inspection methods of this invention, as described before, the TFTs are energized, deenergized and re-energized, with the amount of discharged electricity measured, equally in the first step in which they are not filled with a liquid crystal and the second step in which they are filled with a liquid crystal to form display cells. Then, the difference between the amounts of discharge measured in the first and second steps is integrated or the difference between the time constants of the amounts of discharge is determined. First, a configuration involving an auxiliary pixel capacitor $C_s$ and a pixel capacitor $C_{LC}$, as in the second step, will be discussed.

Figure 3:
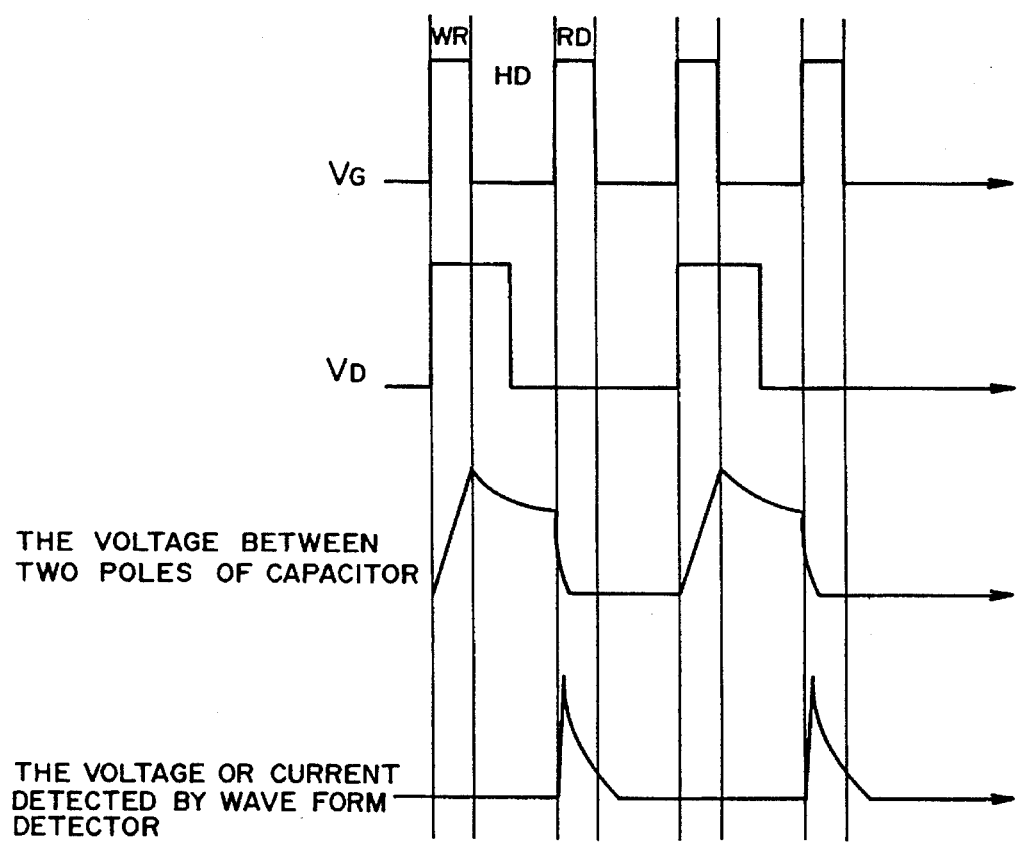
FIG. 3 is an input/output waveform graph showing the amounts of electricity charged and discharged in the use of the TFTs according to this invention.
Figure 5:
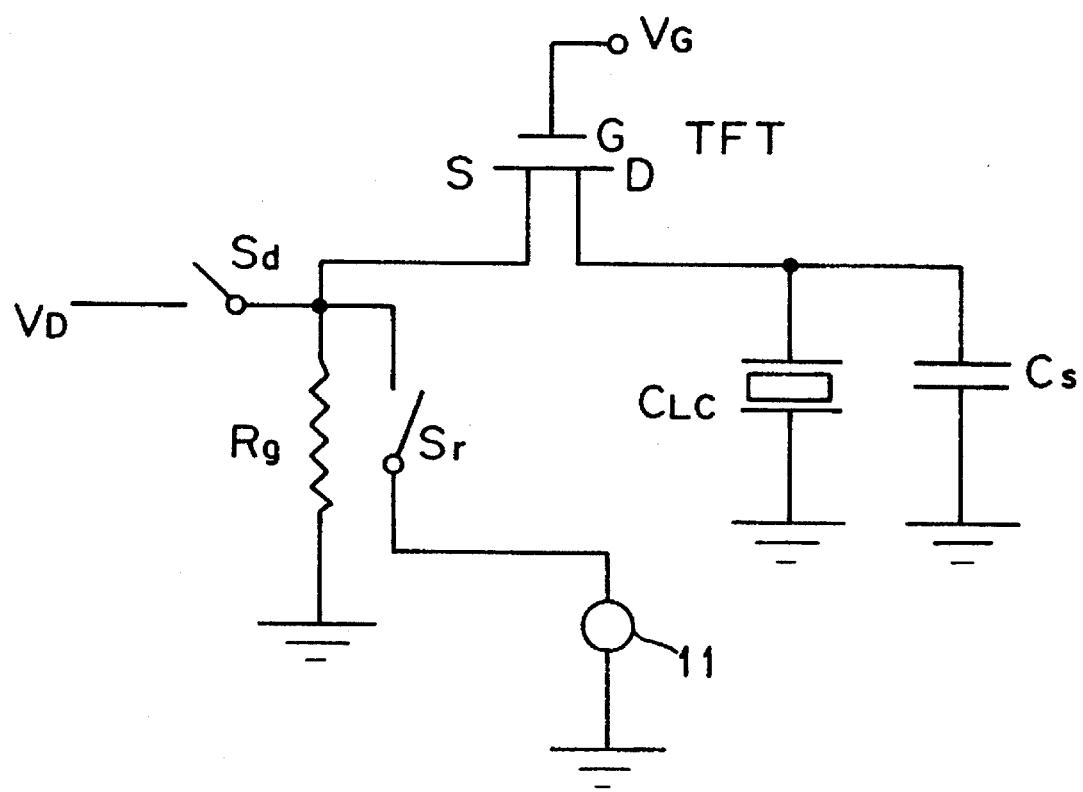
FIG. 5 is a basic circuit diagram showing the basic configuration of a TFT-LCD circuit before the filling of a liquid crystal.

Let us assume that gate voltage $V_G$ and data voltage $V_D$ shown in FIG. 3 are applied and a first switch $S_d$ is turned on in a basic circuit shown in FIG. 5. Then, the data voltage $V_D$ keeps the auxiliary pixel capacitor $C_s$ and liquid-crystal-filled pixel capacitor $C_{LC}$ charged while the pulse voltage of the gate voltage $V_G$ exists.

While the first switch $S_d$ is turned on, a second switch $S_r$ is turned off because there is no need to measure the data voltage $V_D$ with a measuring unit 11.

When the pulse voltage of the gate voltage $V_G$ disappears and the TFTs are deenergized, the resistance between the source and drain of the TFTs become $10^5$ to $10^6$ times greater than when the TFTs are energized by the gate voltage $V_G$. Therefore, the auxiliary pixel capacitor $C_s$ and liquid-crystal-filled pixel capacitor $C_{LC}$ remain charged, because the electric charges in them decreases only very slowly through leakage.

When the first switch $S_d$ is turned off and the second switch $S_r$ between the drain and waveform analyzer is turned on after energizing the source and drain of the TFTs by applying the pulse voltage of the gate voltage $V_G$, the electric charge stored in the pixel capacitor $C_{LC}$ and auxiliary pixel capacitor $C_s$ is released through the resistor $R_g$ connected to the drain and source.

Figure 4A:
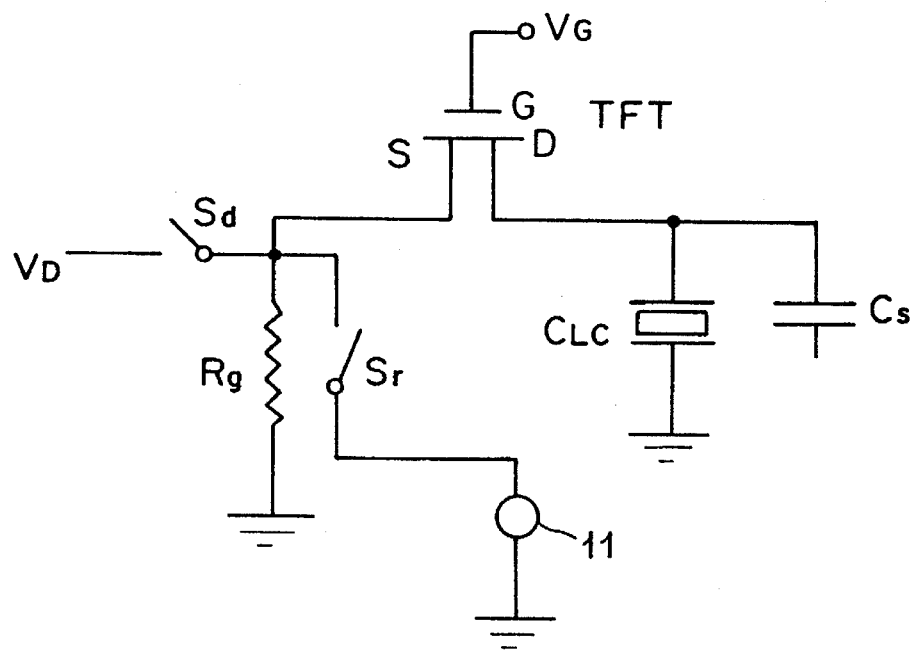
FIGS. 4(a) and (b) show the principle of a conventional liquid crystal cell inspecting method and a circuit showing the condition of stray capacitance actually present.
Figure 4B:
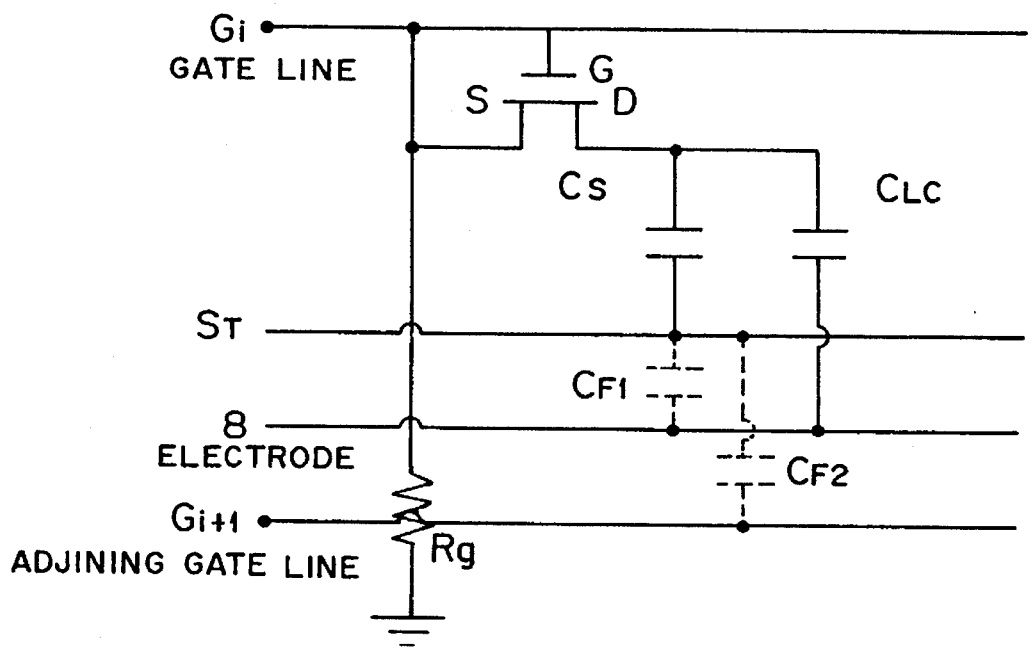

The circuit shown in FIG. 5 differs from the one shown in FIG. 4(a) in that one end of the auxiliary pixel capacitor $C_s$ is connected to the ground. Even if auxiliary pixel capacitor $C_s$ is disconnected from the ground, however, overall capacity remains unchanged because of the stray inductance, as described earlier. Therefore, the measurement in the second step can be carried out whether one end of the auxiliary pixel capacitor $C_s$ is connected to or disconnected from the ground.

The first switch $S_d$, which is turned off to prevent the discharged electricity from flowing to the data power supply, is not an essential component of this invention.

The resistor $R_g$ serves as a resistor between the drain of each TFT and the ground including the guard ring when each terminal is connected to a guard ring in the manufacturing process of the TFT-LCD. When the guard ring is removed, the resistor $R_g$ serves as a detecting resistor artificially connected to facilitate the measurement made by the measuring unit 11. This resistor is designed to provide a resistance not larger than approximately 1/100 of the resistor $R_{on}$ that functions between the source and drain when the TFT is on.

When the second switch $S_r$ is turned on, the waveform analyzer catches the discharged current or voltage. Still, the second switch $S_r$ too is not an essential component of this invention.

Part of the discharged voltage or current shows a sawtooth waveform like the third waveform from the top in FIG. 3. The transient of the sawtooth waveform is expressed as follows:

$$v_2 = V_g \exp\{-t/(C_s + C_{LC})(R_{on} + R_g)\}$$

The time constant is expressed as $T_2 = (C_s + C_{LC})(R_{on} + R_g)$.

$V_g$ is the terminal voltage of the resistor $R_g$ when t=0, where t=0 ignores the rise time of voltage.

Figure 1:
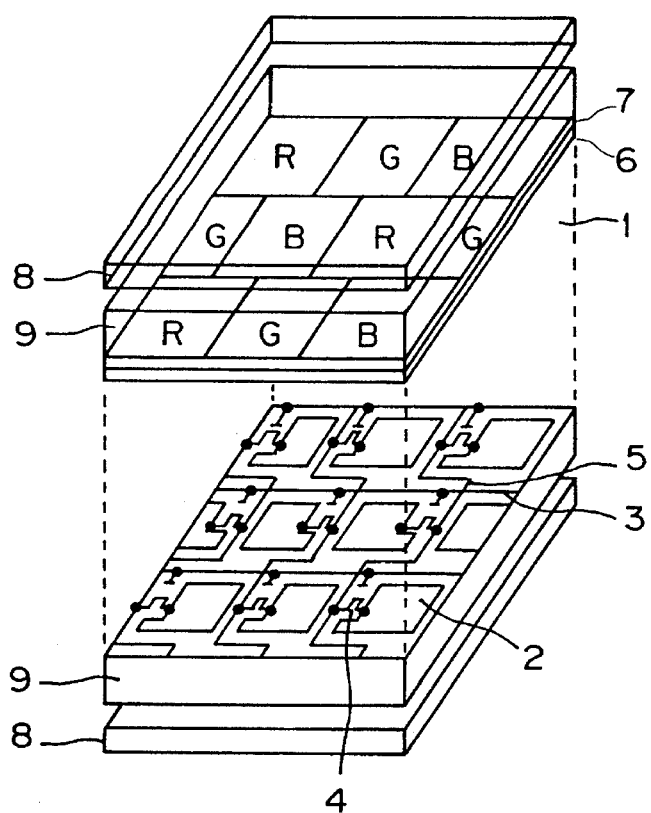
FIG. 1 is a schematic sketch outlining the configuration of each pixel forming a liquid crystal.
Figure 2:
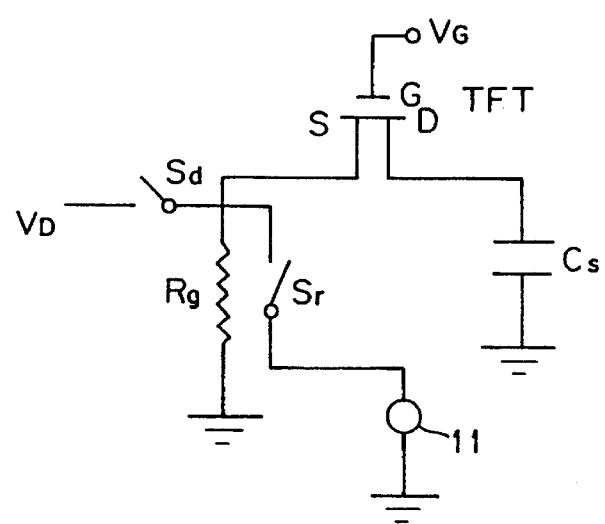
FIG. 2 is a basic circuit diagram showing the basic configuration of a TFT-LCD circuit before the filling of a liquid crystal.

Before determining the discharged electricity in the second step, the auxiliary pixel capacitor $C_s$ is charged and discharged in the basic circuit of the TFT-LCD not filled with liquid crystal as shown in FIG. 2 according to the steps shown in FIG. 3. The transient of this condition is expressed as follows:

$$v_1 = V_G \exp\{-t/C_s(R_{on} + R_g)\}$$

Part of the discharged voltage or current in this condition also shows a sawtooth waveform like the third waveform from the top in FIG. 3. The time constant here is expressed as $T_2 = C_s(R_{on} + R_g)$.

$V_g$ is the terminal voltage of the resistor $R_g$ when t=0, where t=0 ignores the rise time of voltage.

The following can be obtained by integrating $v_2 - v_2 = v$ over time:

$$\int_0^\infty v\, dt = V_g \int_0^\infty \exp\{-t/(C_s + C_{LC})(R_{on} + R_g)\}dt - V_g \int_0^\infty \exp\{-t/C_s(R_{on} + R_g)\}dt$$

$$= V_g C_{LC}(R_{on} + R_g)$$

Time quadrature of the output corresponding to each pixel capacitor $C_{LC}$ can be carried out by integrating the difference between the amounts of electricity discharged in the first and second steps over time or determining the difference between the results of time quadrature on the amounts of electricity discharged in the first and second steps.

Accordingly, the capacity of the pixel capacitor $C_{LC}$ in a liquid crystal module can be determined by dividing the result of integration by $V_g(R_{on} + R_g)$.

The determination of the difference between the results of integration or the integration of the difference described above is made by using a computer.

The difference between two time constants is $T=T_2-T_1=C_{LC}(R_{on}+R_g)$. The capacity corresponding to the pixel capacitor $C_{LC}$ in a liquid crystal module can be derived from the difference between the time constants of the two power curves, whereas the capacity of the same pixel capacitor $C_{LC}$ can be derived from $C_{LC}=T/(R_{on}+R_g)$.

The time constants $T_1$ and $T_2$ can be determined by actual measurement or by using a computer, depending on the degree of the attenuation of discharged electricity appearing on the sawtooth waveforms.

The approximate capacity of each pixel capacitor $C_{LC}$ in the liquid crystal module normally filled with a liquid crystal is predicted beforehand.

Accordingly, the liquid crystal module is normal when the capacities of the pixel capacitor $C_{LC}$ in two conditions agree with the predicted value and abnormal when they do not agree.

Thus, the methods (1) and (2) of this invention permit accurately judging whether the electrodes of each pixel function normally or not after it has been filled with a liquid crystal.

Now an embodiment of this invention based on the above basic principle will be described below.

Embodiment

Figure 6:
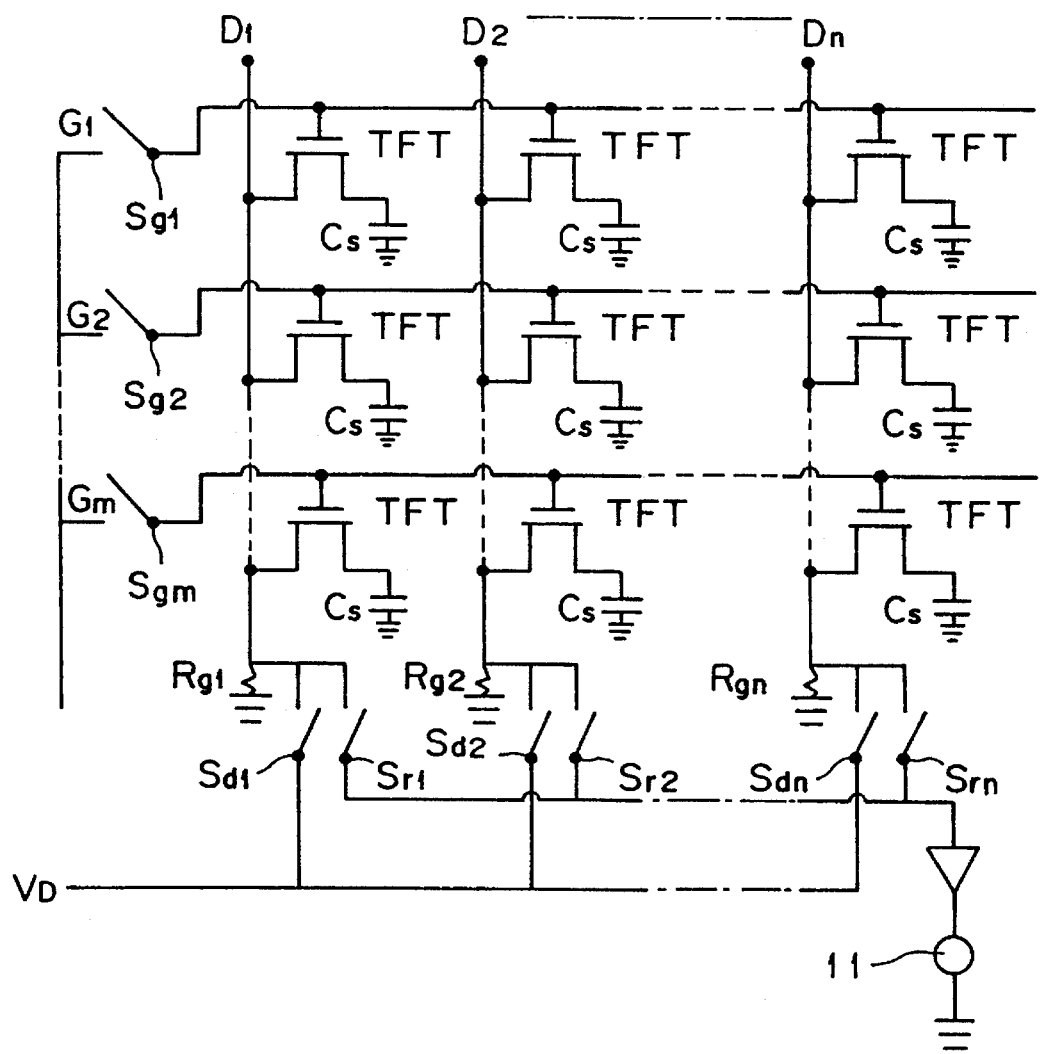
FIG. 6 is an overall circuit diagram showing the arrangement of a circuit of a preferred embodiment of this invention.

FIG. 6 shows an embodiment of this invention.

Switches $S_{g1}, S_{g2}, \ldots S_{gm}$ are provided in gate lines $G_1, G_2, \ldots G_m$ of TFTs arranged to correspond to individual pixels, whereas switches $S_{d1}, S_{d2}, \ldots S_{dm}$ are provided in gate lines $D_1, D_2, \ldots D_m$ of TFTs arranged similarly. Switches $S_{r1}, S_{r2}, \ldots S_{rm}$ corresponding to individual data lines are also provided in the waveform analyzer.

By throwing switches $S_{g1}, S_{g2}, \ldots S_{gm}$ one after another, through a relay, before a liquid crystal is filled in, the amount of electricity discharged by the auxiliary pixel capacitor $C_s$ in the first step is detected.

After each pixel has been filled with a liquid crystal, the amounts of electricity discharged by the auxiliary pixel capacitor $C_s$ and the pixel capacitor $C_{LC}$ are determined by actuating the relay. Then, the capacity of the pixel capacitor $C_{LC}$ filled with a liquid crystal is derived from the difference between the time constants of the discharged outputs, as described in (1) before, or the result of integration on the difference between the discharged outputs, as described in (2). Whether the liquid crystal in each pixel is normal or not can be judged based on the results of calculation.

Effects of the Invention

As is obvious from the above, the inspecting method of this invention permits judging the condition of the liquid crystal in each pixel, based on the capacity of the pixel capacitor $C_{LC}$ filled with a liquid crystal, more accurately than the conventionally proposed methods.

When the difference between the integrated values of the two outputs or the integrated value of the difference between the two outputs is determined, influences of the stray capacitance between the TFTs and data lines and between the data and gate lines are eliminated. Therefore, no measurement error due to stray capacitance arises.

As is obvious from the above, the liquid crystal cell inspection method of this invention has much greater advantage and usefulness than the conventional ones.

What is claimed is:

1. A method of inspecting cells of liquid crystal displays comprising the steps of:

energizing empty thin film transistors (TFTs) in active color LCD arrays to charge each auxiliary pixel capacitor corresponding to individual electrodes thereof, each TFT having a gate, source and drain, maintaining a charged condition of said auxiliary pixel capacitor, by de-energizing the TFTs, releasing the electric charge of each said auxiliary pixel capacitor through the source and drain of each TFT and a resistor connected to a ground side thereof, by re-energizing the TFTs, measuring a first amount of discharge of each said auxiliary pixel capacitor, filling said TFTs with a liquid crystal, energizing said filled TFTs to charge each auxiliary pixel capacitor corresponding to individual electrodes thereof, maintaining a charge condition of said auxiliary pixel capacitor by de-energizing the filled TFTs, releasing the electric charge of each said auxiliary pixel capacitor through the source and drain of each filled TFT and said resistor connected to the ground site thereof, by re-energizing the filled TFTs, measuring a second amount of discharge of each said auxiliary pixel capacitor, and one of:

determining a difference between the first and second amounts of discharge, and integrating said determined difference, and integrating said first and second amounts of discharge, and determining a difference between said integrated first and second amounts of discharge.

2. A method according to claim 1, further comprising the step of inspecting electrodes of individual liquid crystal modules to said liquid crystal displays by successively inspecting data and gate lines connected to the TFTs in the order in which the data and gate lines are arranged.

3. A method of inspecting cells of liquid crystal displays, comprising the steps of:

energizing empty thin film transistors (TFTs) in active color LCD arrays to charge each auxiliary pixel capacitor corresponding to individual electrodes thereof, each TFT having a gate, source and drain, maintaining a charged condition of said auxiliary pixel capacitor, by de-energizing the TFTs, releasing the electric charge of each said auxiliary pixel capacitor through the source and drain of each TFT and a resistor connected to a ground side thereof, by re-energizing the TFTs, measuring a first amount of discharge of each said auxiliary pixel capacitor, determining a first time constant of said first amount of discharge, filling said TFTs with a liquid crystal, energizing said filled TFTs to charge each auxiliary pixel capacitor corresponding to individual electrodes thereof, maintaining a charged condition of said auxiliary pixel capacitor, by de-energizing the filled TFTs, releasing the electric charge of each said auxiliary pixel capacitor through the source and drain of each filled TFT and said resistor connected to the ground side thereof, by re-energizing the filled TFTs, measuring a second amount of discharge of each said auxiliary pixel capacitor, and determining a second time constant of said second amount of discharge, and subtracting said first time constant from said second time constant.

4. A method according to claim 3, further comprising the step of inspecting electrodes of individual liquid crystal modules of said liquid crystal displays by successively inspecting data and gate lines connected to the TFTs in the order in which the data and gate lines are arranged.

* * * * *